Patented Sept. 21, 1937

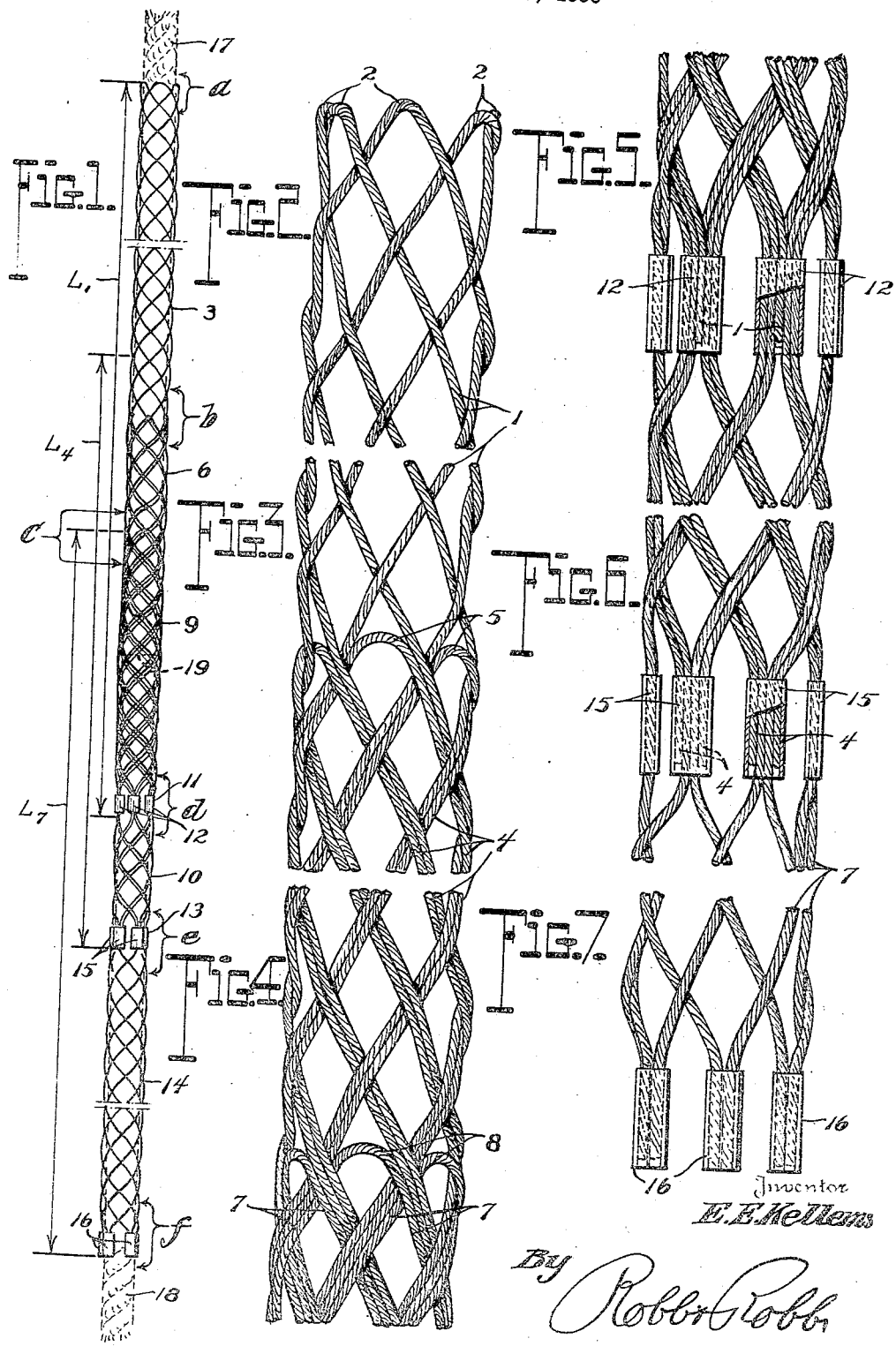

2,093,838

UNITED STATES PATENT OFFICE 2,093,838

GRIPPING DEVICE

Edgar E. Kellems, New York, N. Y., assignor to Kellems Products, Inc., New York, N. Y., a corporation of New York Application February 17, 1936, Serial No. 64,409

11 Claims. (Cl. 96—25)

This invention appertains to flexible gripping devices and method of making the same, and more particularly, to expansible and contractible gripping devices adapted for use as a temporary attachment between two members, such as wire ropes or cables.

One of the most extensive fields of use of the invention is in the reeving of new rope to replace a broken or worn out rope, and especially where the sheaves over which the rope is trained, are inaccessible, or clearances are limited. Some of the most common uses of wire rope or cable occur in the following equipment: elevators, oil rigs, cranes, derricks, dredges, power shovels, draglines, car dumpers, coal and ore unloaders, etc. In certain of this equipment, there may be hundreds of feet of wire rope in a single installation, as in the case of an elevator in a tall building, or in an oil rig, and this rope may be supporting a load of great weight. When the old rope breaks or wears out, it is a very difficult job to replace the same, even under the most favorable conditions. It has been the practice to pull the new rope into place by means of the old rope and as the old rope is pulled out. To accomplish this, the new rope must be securely and carefully fastened or "married" to the old rope, and this connection must be just right, to avoid rope damage and minimize dangerous working conditions. Heretofore, it has been customary to splice one end of the new rope to the end of the old rope, preparatory to pulling in the new rope and pulling out the old. A good splice requires considerable skill and time, and is therefore an expensive operation. A poor splice may unbalance the rope and is a potential hazard to the equipment and to the men engaged in the cable installation. Other types of temporary attachments of the rope ends, as by tieing the ropes together with wire, have been employed, but the risk or hazard is ordinarily far too great, with the result that there has been a great demand of long existence for some safe and practical means for facilitating or expediting reroping operations.

One of the primary objects of the present invention is to provide a flexible tubular gripping device particularly applicable to gripping wire rope or the like, wherein the gripping device is so constructed as to provide portions of different tensile strengths substantially in accordance with the different strains and stresses imparted thereto during use and providing for an adequate factor of safety. That is to say, I have provided a gripping device which is reinforced at suitable intervals in approximate proportion to the increased strains occurring at these intervals.

Another object of the invention is to provide a gripping device of the expansible and contractible open-mesh fabric type embodying interwoven flexible strands, wherein the weave is varied at intervals in the length of the gripping device to afford progressively increasing stiffness and strength from the ends towards the central portion of the device.

A still further object of the invention is to provide a flexible gripping device of the woven strand type forming a unitary tubular body and embodying one or more multiple weave sections where the strains on the gripping device will be greatest during use, and certain of said sections terminating in a single strand weave section.

Still another object of the invention is to provide a woven tubular gripping body having the multiple weave strands disposed in juxtaposition on the circle of the tube so that there will be no internal or external projections which will tend to make it difficult to apply the gripping body onto a rope end, or cause the body to catch or hang on the sheaves in reeving the rope. In other words, it has been my aim to produce a tubular body of substantially uniform diameter from end to end, both inside and outside, the body being adapted to closely embrace the rope when applied thereto and be contracted about the same so that the greater the pull on the rope, the tighter the tubular body grips.

The invention further contemplates an improved method of constructing woven wire expansible and contractible gripping devices whereby additional strands may be added for forming multiple weave sections, or strands may be subtracted from multiple weave sections, as desired, without interrupting the continuity of the woven body as a whole.

Other and further objects and advantages of the invention will be hereinafter described and the novel features thereof defined by the appended claims.

In the drawing:—

Figure 1 is a view in elevation of a gripping device constructed in accordance with the present invention, and showing how the same is applied to the rope ends to serve as a temporary attachment between two ropes;

Figures 2, 3, 4, 5, 6, and 7 are enlarged detail views, in elevation, of those portions of the gripping device shown in Figure 1, respectively designated a, b, c, d, e, and f.

Like reference characters designate corresponding parts in the several figures of the drawing. As shown, the gripping device is composed of interwoven or interlaced strands, preferably of wire, which are arranged about a common axis to provide an elongated tubular body of substantial length, and open at its opposite ends so that the body may receive at each end, an end of a rope or other member to be gripped thereby. There is thus provided an open-mesh fabric wherein the strands are helically arranged so as to permit an expansion or contraction of the body in a manner well-known to those skilled in the art.

In weaving the tubular gripping body, I preferably take a plurality of strands of wire, designated 1, and fold or bend each strand double, so as to provide a series of loops 2 arranged in substantially uniformly spaced relation about a common axis. The free ends of these strands are then interlaced or interwoven together in the nature of a single strand weave, so as to provide a tubular gripping section of any desired length, this single weave section being generally designated 3 in Figure 1. Before the extreme ends of the strands 1 are reached in the weaving operation, I add additional strands, 4, and continue the weaving in the nature of a multiple or double strand weave. As in the case of the strands 1, the strands 4 are doubled upon themselves to provide loops 5, corresponding to loops 2, arranged in uniformly spaced relation about the axis of the tube. The free ends of the strands 4 are extended in the same direction as the free ends of the strands 1, so that these strands can be woven together in two-strand groups without interrupting the continuity of the weave. This multiple or double weave is continued for any desired length of the tubular gripping body, as indicated by the reference character 6 in Figure 1, whereupon, I preferably add additional strands 7, in substantially the same manner as strands 4 were added, these strands 7 also being doubled to provide loops 8 corresponding to loops 5 and 2 previously referred to. Strands 7 are also extended in the same direction as the free ends of strands 1 and 4, so that these strands may now be grouped together in groups of three, and the weave continued as a multiple or triple strand weave in the same manner as described above with reference to the double weave. The triple weave section continues for any desired length of the tubular body, as indicated generally by the reference character 9 in Figure 1.

After a suitable length of the triple weave section has been woven, the weave is reduced to a double weave section 10, similar to that designated 6 in Figure 1. This is accomplished by terminating the strands 1 at 11, and continuing the weave with the free ends of strands 4 and 7. The extreme ends of the strands 1 are preferably secured to the woven body in such a manner that the ends cannot unravel or project within the tube or beyond the outer surface thereof. Metal clips or ferrules 12 may be utilized and firmly compressed about the strands, including the extreme ends of the strands 1, whereby to firmly anchor these latter ends, as shown in Figure 5.

It will be noted that the interweaving of the strands is reversed just beyond the points of anchorage of the extreme ends of the strands 1, that is, just beyond the clips or ferrules 12. This reversal of the weave results in the advantage that the strands may be grouped together in side-by-side relation and without overlapping each other at the points where the strands 1 terminate and the extreme ends of these strands are anchored to the other strands. The clips or ferrules 12 may therefore be flattened so as not to produce any substantial bulge or shoulder at these points which would make it difficult, if not impossible, to pull the gripping device over a sheave, when gripping a cable, as will hereinafter become more apparent.

The double weave section 10 is continued for a suitable distance, as for example, to about the point 13, whereupon the weave is reduced to a single strand weave 14, by terminating the strands 4 and anchoring these strands to the other strands, as by means of the clips or ferrules 15, corresponding to the clips or ferrules 12. The single weave section 14 is produced by interweaving the free ends of the strands 7 which are continued beyond the free ends of both the strands 1 and 4 until the section 14 acquires the desired length, which is preferably equal to the length of the single strand section 3. Thereupon, the strands 7 are terminated and secured together in groups by means of the clips or ferrules 16, in a manner generally the same as in the case of clips 12 and 15.

It will be understood from the foregoing description that the woven tubular body thus formed comprises interwoven strands which are progressively added or multiplied, and subtracted, in the course of the weaving, from one end of the body to the other, and all without interrupting the continuity of the body. The addition of the strands and the subtraction thereof may be varied to suit the particular service for which the gripping device is designed, but I preferably weave the end sections of the gripping body in the form of single strand weaves 3 and 14, respectively merging into the double strand weave sections 6 and 10, which in turn merge in a central triple strand weave section 9.

As best shown in Figure 1, the respective strands 1, 4 and 7, may be said to overlap for certain portions of their lengths, while portions of the ends of the strands extend or continue beyond certain of the overlapping portions. In other words, strands 1 continue for a distance $L_1$; strands 4 continue for the distance $L_4$; and strands 7 continue for the distance $L_7$. The distance $L_4$ overlaps $L_1$, but extends somewhat beyond the latter, while the distance $L_7$ overlaps both $L_4$ and $L_1$, and extends beyond each of the latter. Such an arrangement of the strands contributes materially to the simplicity of the weaving operations, and enables the strands to be grouped together in the multiple weave sections so that the thickness of the tubular body formed by the interwoven strands may be kept to a minimum, and hence, the flexibility of the body maintained.

The use of the grip device should be apparent from the foregoing, and may be briefly described as follows: Let it be assumed that it is desired to attach the ends of two ropes together, as for example, a new rope and an old rope. If the rope ends are enlarged or opened up, the ends should be compressed and preferably covered, as by wrapping a thin strip of steel, wire, cord, or the like, thereabout, so that the gripping device will slip easily over the ends of the rope. If desired, the rope ends may be hammered smooth and then welded, although this only infrequently may be necessary. After suitably preparing the rope ends so that the gripping device may be readily slipped onto the same, the end of one of the ropes, preferably the old rope, is inserted into the open end of the gripping device formed by the loops 2, as this end of the grip fits closer and is less likely to catch on obstacles. The grip may be expanded or opened up by pushing back the end of the grip towards the center, thereby making it easier to introduce the rope end into the grip. The other end of the gripping device, that is, the end formed by the single strand weave section 14, is slipped over the other rope end, as for example, the new rope. The ends of the new and old rope should butt together at the center of the gripping device where the weave is strongest or heaviest. In Figure 1, 17 designates generally one rope, such as an old rope, and 18 designates generally another rope, such as a new rope, which is to be temporarily attached to the rope 17. It will be noted that these ropes extend into the gripping device through the oppositely open ends thereof, and the extreme ends of the ropes butt together, as indicated by the reference character 19. After the gripping device has been applied over the ends of the ropes to be joined together, slack is removed from the grip by working the grip outwardly with the hands from the center towards each end. Each end of the grip is then preferably served with a tight cord or soft rope, or tape, to minimize any likelihood of the grip catching on obstacles, or loosening of the grip. The holding power of the grip depends upon the friction developed between the ends of the grip and the ropes, but if the attachment of the grip to the ropes is carefully made, as described above, the grip will develop a holding power substantially equal to its ultimate strength. Moreover, the harder the pull, the more tightly the gripping device grips the ropes.

Having "married" the rope ends by means of the gripping device, the reroping operation may be carried out in the usual manner heretofore practiced, as for example, by pulling out the old rope, so as to pull the new rope in. Inasmuch as the gripping device is quite flexible, it can readily and safely pass over sheaves and around other bends. The multiple weave at the central portion of the gripping device, being relatively stiffer than the end portions, serves to keep the rotating tendency of the respective ropes during the reroping operations, to a minimum. It will be understood that the strain on the gripping device will be greatest at the section where the ends of the ropes butt together in the grip, and this strain is in the nature of a tensile stress. Accordingly, the heaviest weave should be strong enough to prevent the grip from breaking when subjected to the maximum stress, with, of course, a suitable factor of safety. On either side of this section where the strain is greatest, the tensile stresses decrease substantially in proportion to the distance from the line of abutment of the rope ends, because the force to which the grip is subjected may be resolved into substantially two components, namely, an axial force, and a transverse force due to the contraction of the gripping device about the ropes. By making the gripping device of substantial length, the frictional contact between the grip and the rope is increased and distributed over a considerable area. The end sections of the gripping device need not be as strong as the central portion because of the fact that the stresses to which these end sections are subjected are not so great, and are principally stresses which produce a contraction of the gripping device to cause the device to grip the rope.

It is to be understood that I do not wish to be limited to the use of my new and improved gripping device with wire rope or cable, as it will be apparent that the same may be applicable to other uses where a temporary or quick connection is desired to be made between two members which are capable of being received and gripped by the tubular body.

Moreover, the invention is not to be confined to a gripping device which is open at both ends, as the variable strength, multiple weave feature is also applicable to cable grips where the draft is applied to one or both ends of the grip through means of one or more pulling heads or draft eyes of any of the conventional types well known in the art, and to which the ends of the strands of the gripping body are secured.

For example, all the strands may be terminated at about the point indicated by the reference character 11 in Figure 1, and the ends of the strands secured to a pulling head or eye, in which case, the strand sections 10 and 14 are omitted. Such a modification is within the purview of the appended claims.

In use, this grip may be slipped over the end of the cable by passing the latter through the open end of the gripping body formed by the loops 2 just as in the case of applying the upper half of the gripping body to the wire rope 17 as seen in Figure 1, it being understood, of course, that the grip should be passed onto the cable far enough for the end of the latter to be disposed substantially within the multiple weave section 9, and preferably close up to the draft head or eye at the end of this section.

While the specific details have been herein shown and described, the invention is not confined thereto, as changes and alterations may be made without departing from the spirit thereof as defined by the appended claims.

Having thus described my invention, what I claim as new and desire to secure by Letters Patent, is—

1. A gripping device of the class described, comprising a plurality of flexible relatively inelastic strands interwoven about a common axis to form an elongated transversely expansible and contractible tubular body, the strands being arranged in overlapping groups in the woven body whereby to provide a reinforced multiple strand section intermediate the ends of the body.

2. A gripping device of the class described, comprising a plurality of flexible relatively inelastic strands interwoven about a common axis to form an elongated radially expansible and contractible tubular body, the strands being arranged in axially displaced overlapping groups with the strands of one group extended beyond the strands of the other group, whereby to provide a reinforced multiple strand section intermediate the ends of the body.

3. A gripping device of the class described, comprising a plurality of flexible relatively inelastic strands interwoven about a common axis to form an elongated expansible and contractible tubular body, the strands being progressively multiplied at intervals intermediate the ends of the body whereby to provide sections of differing strengths.

4. A gripping device of the class described, comprising a plurality of flexible strands interwoven about a common axis to form an elongated expansible and contractible tubular body, the strands being progressively multiplied at axially displaced intervals intermediate the ends of the body whereby to provide sections of differing strengths and flexibility.

5. A gripping device of the class described, comprising a plurality of relatively inelastic strands interwoven about a common axis to provide a tubular body section of substantial length, and additional inelastic strands interwoven with the first-mentioned strands for a portion of the length of the body section aforesaid, said additional strands extending beyond one end of the body section formed by the first-mentioned strands whereby to provide gripping sections of differing strengths.

6. A gripping device of the class described, comprising a plurality of strands interwoven about a common axis to provide a tubular body section of substantial length, and additional strands interwoven with the first-mentioned strands for a portion of the length of the body section aforesaid, said additional strands extending beyond one end of the body section formed by the first-mentioned strands whereby to provide gripping sections of differing strengths, the central portion of the device having the form of a multiple strand weave, and the terminal portions having the form of a single strand weave.

7. A gripping device of the class described, comprising a plurality of strands interwoven about a common axis to provide a tubular body section of substantial length, and additional strands interwoven with the first-mentioned strands for a portion of the length of the body section aforesaid, the free ends of the first-mentioned strands terminating and being secured to the contiguous additional strands intermediate the ends of the latter.

8. A gripping device of the class described, comprising a plurality of relatively inelastic strands interwoven about a common axis to provide a tubular body section of substantial length, and additional inelastic strands interwoven with the first-mentioned strands for a portion of the length of the body section aforesaid and extending beyond one end of the body section whereby to provide a central gripping section of greater strength than the end section.

9. A tubular woven wire gripping device having the portions of its strands at its end returned towards its opposite end to form a series of loops in uniformly spaced relation about the axis of the body, a plurality of additional strands interwoven with the first-mentioned strands and having portions thereof returned in the same direction as the first-mentioned strands and continued beyond the ends of the latter, the ends of the additional strands being bound together so as to leave the tubular body axially open from end to end.

10. The method of forming expansible and contractible gripping devices of the class described, comprising interweaving flexible strands into a body of tubular form, and simultaneously interweaving additional strands with the first-mentioned strands from a point relatively spaced from one end of the tubular body, and continuing the interweaving of the additional strands beyond the ends of the first-mentioned strands, whereby to provide a multiple weave section intermediate the opposite ends of the tubular body.

11. A gripping device of the class described, comprising a plurality of flexible relatively inelastic strands interwoven about a common axis to form an elongated expansible and contractible tubular body, the strands being arranged in the woven body in groups overlapping in the direction of the length of the tubular body whereby to provide a reinforced multiple strand section.

EDGAR E. KELLEMS.